United States Patent
Medwed et al.

(10) Patent No.: US 12,399,834 B2
(45) Date of Patent: Aug. 26, 2025

(54) DATA PROCESSING SYSTEM HAVING TAGGED AND UNTAGGED ADDRESS POINTERS AND METHOD FOR ACCESSING A LOCATION IN THE DATA PROCESSING SYSTEM

(71) Applicant: NXP B.V., Eindhoven (NL)

(72) Inventors: Marcel Medwed, Graz (AT); Jan Hoogerbrugge, Helmond (NL)

(73) Assignee: NXP B.V., Eindhove (NL)

( * ) Notice: Subject to any disclaimer, the term of this patent is extended or adjusted under 35 U.S.C. 154(b) by 67 days.

(21) Appl. No.: 18/456,732

(22) Filed: Aug. 28, 2023

(65) Prior Publication Data

US 2025/0077439 A1   Mar. 6, 2025

(51) Int. Cl.
*G06F 12/10* (2016.01)

(52) U.S. Cl.
CPC ........ *G06F 12/10* (2013.01); *G06F 2212/657* (2013.01)

(58) Field of Classification Search
CPC ...... G06F 12/04; G06F 12/10; G06F 12/0646; G06F 12/023
USPC .......................... 711/4, 201, 112, 111, 154, 6
See application file for complete search history.

(56) References Cited

U.S. PATENT DOCUMENTS

| | | | |
|---|---|---|---|
| 4,241,396 A | 12/1980 | Mitchell et al. | |
| 6,718,444 B1 * | 4/2004 | Hughes | G06F 13/161 710/39 |
| 8,732,430 B2 | 5/2014 | Radovic et al. | |
| 9,684,679 B2 * | 6/2017 | Lucco | G06F 12/0253 |
| 11,295,025 B2 | 4/2022 | Medwed et al. | |
| 2017/0024128 A1 | 1/2017 | Beale et al. | |
| 2017/0115923 A1 | 4/2017 | Hurvitz | |
| 2019/0042799 A1 | 2/2019 | Durham et al. | |
| 2020/0125501 A1 | 4/2020 | Durham et al. | |
| 2020/0125770 A1 | 4/2020 | Lemay et al. | |
| 2020/0201789 A1 * | 6/2020 | Durham | H04L 9/0894 |
| 2020/0409868 A1 | 12/2020 | Durham | |

(Continued)

FOREIGN PATENT DOCUMENTS

WO   2021162792 A1   8/2021

OTHER PUBLICATIONS

"Armv8.5—A Memory Tagging Extension"; ARM White paper; No date listed on paper; Retrieved from the Internet Aug. 25, 2023: https://developer.arm.com/-/media/Arm%20Developer%20Community/PDF/Arm_Memory_Tagging_Extension_Whitepaper.pdf.

(Continued)

*Primary Examiner* — Jared I Rutz
*Assistant Examiner* — Edward Waddy, Jr.

(57) ABSTRACT

A data processing system is provided that includes a processor and a memory. The processor is configured to execute instructions to access a location pointed to by an address pointer. The memory is coupled to the processor and configured to have a plurality of memory portions. A first address pointer for accessing a first portion of the memory includes a type bit field, a tag bit field, and a first address bit field. A second address pointer for accessing a second portion of the memory is configured to have only the type bit field and a second address bit field without the tag bit field. The type bit field is set to a first value for the tagged pointer and a second value for the untagged pointer. In another embodiment, a method is provided for accessing a location in the data processing system.

20 Claims, 4 Drawing Sheets

(56) References Cited

U.S. PATENT DOCUMENTS

2021/0200546 A1* 7/2021 Lemay ................. G06F 12/145
2022/0382885 A1* 12/2022 Durham ............... G06F 9/3004

OTHER PUBLICATIONS

"CORE-V-MCU", https://docs.openhwgroup.org/projects/core-v-mcu/doc-src/overview.html; Copyright 2022—present, OpenHW Group. Revision 266649d6.
Nasahl, Pascal et al.; "CrypTag: Thwarting Physical and Logical Memory Vulnerabilities using Cryptographically. Colored Memory"; ASIA CCS '21: Proceedings of the 2021 ACM Asia Conference on Computer and Communications Security; May 2021; DOI:10.1145/3433210.3453684.
Saileshwar, Gururaj, et al.; "HeapCheck: Low-cost Hardware Support for Memory Safety"; ACM Transactions on Architecture and Code Optimization, vol. 19, Issue 1, Article No. 10; Jan. 2022; https://doi.org/10.1145/3495152.

* cited by examiner

| | | | |
|---|---|---|---|
| 33 | 34 | | 31 |
| TYPE = 0 (ONE BIT) | ADDRESS (31 BITS) | | |

| | | | |
|---|---|---|---|
| 35 | 36 | 37 | 32 |
| TYPE = 1 (ONE BIT) | TAG (T BITS) | ADDRESS (31 - T BITS) | |

FIG. 2

| START ADDRESS | END ADDRESS | TARGET |
|---|---|---|
| 0x1a000000 | 0x1a03ffff | BOOT ROM |
| 0x1a100000 | 0x1a2dffff | PERIPHERAL DOMAIN |
| 0x1a300000 | 0x1a3fffff | EFPGA DOMAIN |
| 0x1c000000 | 0x1c007fff | NON-INTERLEAVED RAM BANK 0 |
| 0x1c008000 | 0x1c00ffff | NON-INTERLEAVED RAM BANK 1 |
| 0x1c010000 | 0x1c07ffff | INTERLEAVED RAM BANK |

DATA PROCESSING SYSTEM HAVING TAGGED AND UNTAGGED ADDRESS POINTERS AND METHOD FOR ACCESSING A LOCATION IN THE DATA PROCESSING SYSTEM

BACKGROUND

Field

This disclosure relates generally to data processing, and more particularly, to a data processing system having tagged and untagged address pointers and method for accessing the data processing system.

Related Art

Tagged address pointers include tag bits having metadata that reveals something about the data to which the address pointer is pointing. Tagged address pointers are used for various purposes. Recently, tagged address pointers have been used to realize or improve memory safety. For example, tagged address pointers can be used to detect read accesses to memory that are out of bounds and write accesses that cause an overflow. For this purpose, the tag value, i.e., the meta data, should be sufficiently large. A typical requirement is at least one byte of data for the tag. Having additional bits for a tag is not a problem in systems with 64 bit address pointers since these systems typically do not need an address space of $2^{64}$ bytes. If the maximum virtual memory size is limited to $2^L$ then the upper 64-L bits can be used for tagging. This works well for 64 bit processor cores but does not work well for 32 bit processor cores where the address space in the pointer is more densely populated. Some cost-efficient micro-controllers include 32 bit processors and often do not have virtual memory support. This restricts the possibilities for memory tagging or limits the tag size that can be used for, e.g., memory safety.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 illustrates an untagged address pointer and a tagged address pointer in accordance with an embodiment.

FIG. 3 illustrates an example memory map for the memory of the data processing system of FIG. 1.

DETAILED DESCRIPTION

Figure 1:
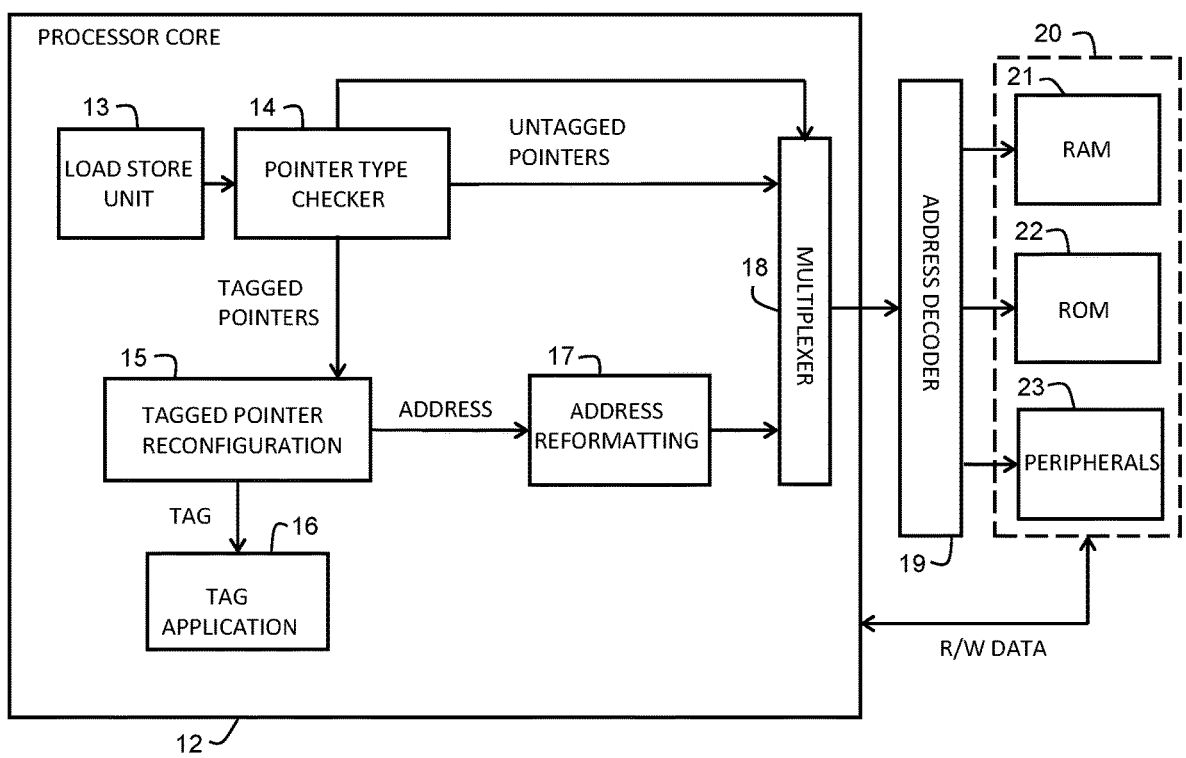
FIG. 1 illustrates a block diagram of a data processing system in accordance with an embodiment.

Generally, there is provided, a data processing system that uses a combination of tagged and untagged address pointers. The tagged address pointer is used to access selected locations in a memory space of the data processing system, and the untagged address pointer is used to access other locations in the memory space. The tagged address pointer is typically used for memory safety, that is, detecting out-of-bound memory accesses and use-after-free accesses, although other uses are possible. Detecting memory safety issues may only be necessary to protect data in random access memory (RAM). Data in read only memory (ROM), code in ROM, code in RAM, and peripheral devices typically do not need memory safety protection. Therefore, the data processing system provides for the use of tagged and untagged address pointers. In one embodiment, a pointer type bit is a type bit field used to indicate whether the remaining bits in the address pointer represent a tagged address pointer that includes a tag bit field and a memory address, or whether the address pointer is an untagged address pointer that only includes a memory address with no tag.

Using a type bit to distinguish tagged pointers from untagged pointers allows the selective use of tagged pointers for the portions of memory space that need tagging. This may be useful for processors, e.g., 32 bit processors, where having enough bits in the address pointer for the tag can be a challenge. Using a 32-bit system as an example, if a memory region that needs tagging for memory safety requires an N-bit address, then 31-N bits can be used for tag bits. In many cases the 31-N bits will be sufficient for a tag. For example, a microcontroller with 512 KB RAM gives N=19 which means that 32−19=13 bits are available for tagging plus a type bit, which is a suitable number of bits for memory safety purposes.

In accordance with an embodiment, there is provided a data processing system including: a processor configured to execute instructions to access a location pointed to by an address pointer; and a memory coupled to the processor, the memory configured to have a plurality of memory portions, wherein a first address pointer is configured to include a tag, the first address pointer for accessing a first portion of the memory, and wherein a second address pointer is configured without a tag, the second address pointer for accessing a second portion of the memory, wherein the first address pointer is configured to have a type bit field, a tag bit field, and a first address bit field, wherein the second address pointer is configured to have only the type bit field and a second address bit field without the tag bit field, and wherein the type bit field is set to a first value for the tagged pointer and a second value for the untagged pointer. The tag may be used to detect a safety issue of the memory. The first portion of the memory may be a random access memory and the second portion of the memory is used for one or more of a boot read only memory, a peripheral, and a field programmable gate array. The type bit field may include a single bit. The type bit field may include multiple bits. The type bit field may include two type bits for providing three tagged address pointer types, each of the three address pointer types addressing a particular address range in the data processing system. The type bit field may include a most significant bit of the first address pointer. The processor may be further configured to reconfigure the tagged address pointer to remove the type bit field, the tag bit field and to reformat the first address bit field according to a predefined criterion.

In another embodiment, there is provided, a method including: executing, by a processor, an instruction to access a location in the data processing system pointed to by an address pointer; checking if the address pointer is a tagged address pointer or an untagged address pointer, wherein the tagged address pointer has a type bit field, a tag bit field, and a first address bit field, wherein the untagged address pointer has the type bit field and a second address bit field without the tag bit field, and wherein the type bit field is set to a first value for the tagged address pointer and to a second value for the untagged address pointer; using a tag in the tag bit field of the tag address pointer according to a designated purpose in a data processing system comprising the processor; and using an address in the address bit field of the tag address pointer to access the location. The method may further include reconfiguring the tagged address pointer to remove the type bit field and the tag bit field prior to using the tagged address pointer for a load or store operation to a memory location. The type bit field may include a single bit. The type bit field may include multiple bits. The type bit field may include two type bits for providing three tagged address pointer types, each of the three address pointer types addressing a particular address range. The tag may be used to detect a memory safety issue.

In yet another embodiment, there is provided, a computer program including instructions stored in a non-transitory medium that when executed perform operations including: executing, by a processor, an instruction to access a location in the data processing system pointed to by an address pointer; checking if the address pointer is a tagged address pointer or an untagged address pointer, wherein the tagged address pointer has a type bit field, a tag bit field, and a first address bit field, wherein the untagged address pointer has the type bit field and a second address bit field without the tag bit field, and wherein the type bit field is set to a first value for the tagged address pointer and a second value for the untagged address pointer; using a tag in the tag bit field of the tag address pointer according to a designated purpose in a data processing system comprising the processor; and using an address in the address bit field of the tag address pointer to access the location. The computer program may further include reconfiguring the tagged address pointer to remove the type bit field and the tag bit field from the tagged address pointer prior to using the tagged address pointer for a load or store operation to a memory location. The type bit field may include a single bit. The type bit field may include multiple bits. The type bit field may include two type bits for providing three tagged address pointer types, each of the three address pointer types addressing a particular address range. The tag may be used to detect a memory safety issue.

FIG. 1 illustrates a block diagram of a data processing system 10 in accordance with an embodiment. Data processing system 10 may be implemented using one or more integrated circuits. Data processing system 10 includes processor core 12, address decoder 19, and memory mapped area 20. Other embodiments may have additional hardware modules. Processor core 12 may be, for example, part of a microprocessor, field programmable gate array (FPGA), application-specific integrated circuit (ASIC), or similar device. Processor core 12 may be a RISC-V processor or any other type of processor architecture. Processor core 12 may be one of multiple processor cores. Processor core 12 executes instructions of a computer program stored in a portion of memory 20. Processor core 12 includes load store unit 13, pointer type checker circuit 14, tagged pointer reconfiguration circuit 15, tag application 16, address reformatting circuit 17, and multiplexer 18.

In response to receiving load and store instructions, load store unit 13 controls accesses to memory 20. Depending on which part of memory 20 is being accessed, memory 20 may be accessed using a tagged address pointer or an untagged address pointer. Pointer type checker circuit 14 is responsible for checking the type bit of the address pointer to determine whether the address pointer is tagged or untagged. Untagged address pointers labeled "UNTAGGED POINTERS" are provided to an input of multiplexer 18. Tagged address pointers labeled "TAGGED POINTERS" are first reconfigured to separate the tag portion of the address pointer from the address portion by tagged pointer reconfiguration circuit 15. Example tagged and untagged address pointers are illustrated in FIG. 2. The tag labeled "TAG" of the address pointer may include metadata that can be used in a tag application 16, which may involve, e.g., memory security. The address portion of the tagged address pointer, labeled "ADDRESS", is provided to address reformatting circuit 17 to be reformatted to a form expected by memory 20. Multiplexer 18 is coupled to provide either the untagged pointer (UNTAGGED POINTERS) or a reformatted address (ADDRESS) from address reformatting circuit 17 to address decoder 19 dependent on a control signal from pointer type checker 14. Address decoder 19 is coupled to provide an address to memory 20. Memory 20 is representative of all memory of data processing system 10 and includes random access memory (RAM) 21, read only memory (ROM) 22, and memory mapped peripherals 23. In response to receiving an address from address decoder 19, read or write data labeled "R/W DATA" may be read from a location in memory 20 or written to a location in memory 20.

FIG. 2 illustrates untagged address pointer 31 and a tagged pointer 32 in accordance with an embodiment. For illustration purposes 32-bit address pointers are shown. Other embodiments may include more or fewer bits. A type bit determines which of tagged or untagged pointers is selected. In untagged address pointer 31, a type bit in bit field 33 is a logic zero to indicate address pointer 31 is untagged and includes only an address bit field 34 besides type bit field 33. Type bit field 35 is a logic one to indicate that address pointer 32 is a tagged address pointer. In other embodiments, the type bit logic may be reversed. In an example 32-bit processor, type bit fields 33 and 35 occupy the most significant bit (MSB) of address pointers 31 and 32, respectively. In address pointer 32, tag bit field 36 includes a tag T and address bit field 37 includes an address that occupies 31-T bits at the right-hand side (the least significant bits) of address pointer 32. In one embodiment, pointer arithmetic requires the address occupy the LSB bits. Other embodiments may be different. It is not strictly necessary to have the pointer-type bit as the MSB.

FIG. 3 illustrates example memory map 40 for memory 20 of FIG. 1. As an example, memory map 40 is from the CORE-V-MCU system by the OpenHW Group's CORE-V family of RISC-V cores, which is an open-source 32-bit design. When an address used by a load or store operation leaves the processor to access a memory or peripheral it must be mapped back to an address that the surrounding system expects. For an untagged pointer there is typically no, or only minimal, remapping needed. The type bit is replaced by either zero or one. For tagged pointers both the type and tag fields are replaced by a proper value according to a predefined criterion of the processor architecture so that it will address the correct location in the address space.

In one embodiment, memory tagging is applied selectively. The tagged address pointer is typically used for memory safety, that is, detecting out-of-bounds memory accesses and use-after-free accesses. Therefore, it may only be necessary to protect data in RAM. Code and data in ROM, code in RAM, and the peripheral domain typically do not need memory safety protection. As an example, memory tagging may be used for the RAM memories of memory map 40, which correspond to the last three entries and are in memory range 0x1c000000 to 0x1c07fffff in FIG. 3. The total memory size of only the RAM memories is 512 KB which corresponds to $2^{19}$ bytes. In memory map 40, the first 3 bits of the address are always 0 and the next bit is always 1. Therefore, in this case, the MSB bit can be used as the type bit to indicate whether the address pointer is tagged or untagged. Bits 30 down to 19 can be used as the tag. The 19 remaining bits below the tag (bits 18 to 0) are used to access the RAM memory address range of $2^{19}$ byte. A tagged memory address pointer would not be possible for all the memory space shown in FIG. 3 because there would not be enough extra bits available for the tag. Selectively tagging only the memory portions that require a tag, and the use of a type bit as shown, can improve memory safety in relatively small systems where tagging would not otherwise be available.

Figure 4:
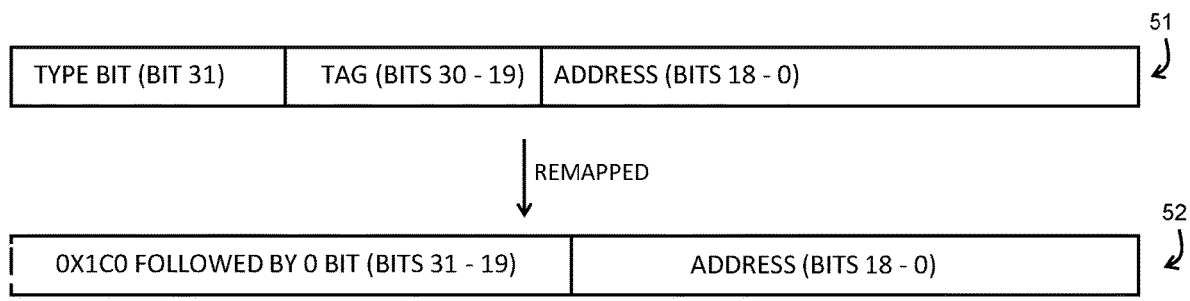
FIG. 4 illustrates a tagged address pointer with a type bit remapped for a memory access operation.

FIG. 4 illustrates an example tagged address pointer 51 with a type bit and a tag remapped for a memory access operation. When a tagged address pointer leaves processor core 12 to access RAM 21, the tagged access pointer should be remapped by address reformatting circuit 17 in FIG. 1 by removing the type and tag bits and replacing them with a properly formatted address as determined by a predefined criterion so that RAM 21 can be accessed. Referring to the example memory map 40 of FIG. 3, a replacement address value 52 corresponds with the tagged address where the 13 most significant bits are replaced by twelve bits corresponding with 0x1c0 (see FIG. 3) followed by a single zero bit. The 19 least significant bits are directly passed from the tagged address to the resulting reformatted address of the replacement address value 52.

Figure 5:
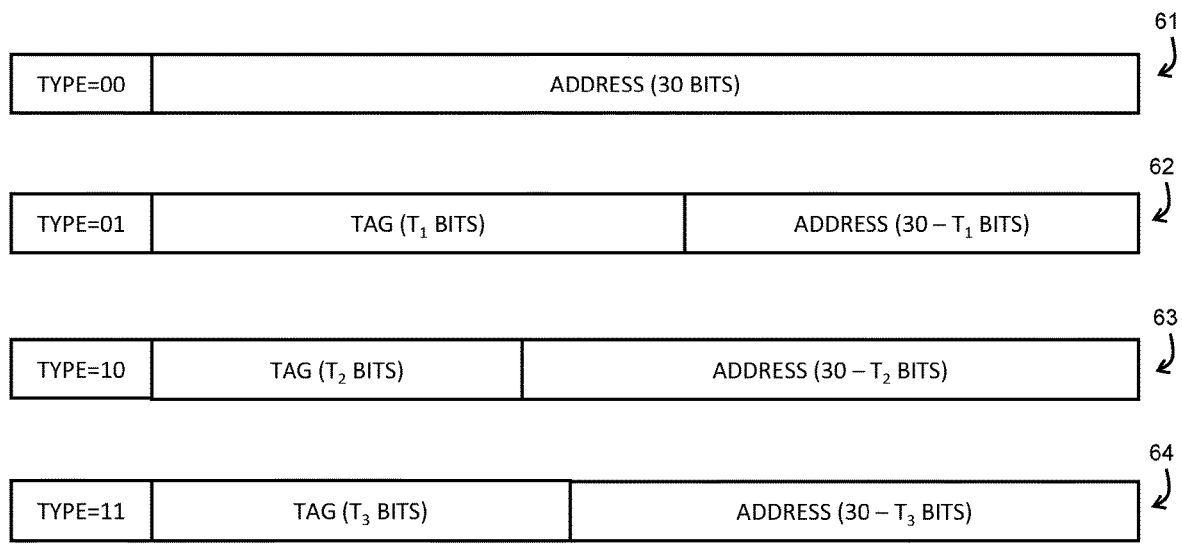
FIG. 5 illustrates an example of a tagged address pointer having more than one type bit in accordance with an embodiment.

FIG. 5 illustrates example address pointers for a 32-bit processor having more than one type bit in accordance with an embodiment. As shown, more than one bit could be used to indicate the type of tagged and untagged address pointers. With two type bits, one memory region may be defined without tagging and three different regions may be defined with tagging. Each of these regions would have a different replacement address value. For example, with two type bits, three tagged pointer types may be provided with each type addressing a particular address range which may be of a different size and therefore also the tag sizes ($T_1$, $T_2$, and $T_3$) may be different. In FIG. 5, address pointer 61 is untagged, which is indicated by two type bits with value 00 in a type bit field and the remaining bits including an address bit field. Address pointer 62 is tagged and includes two type bits with value 01 that indicates a tag bit field of $T_1$ bits so that the address bit field can include 30-$T_1$ bits. Address pointer 63 is tagged and includes two type bits with value 10 to indicate a tag bit field of $T_2$ bits so that the address bit field can include 30-$T_2$ bits. Address pointer 64 is tagged and includes two type bits with value 11 that indicates a tag bit field of $T_3$ bits so that the address bit field can include 30-$T_3$ bits.

Figure 6:
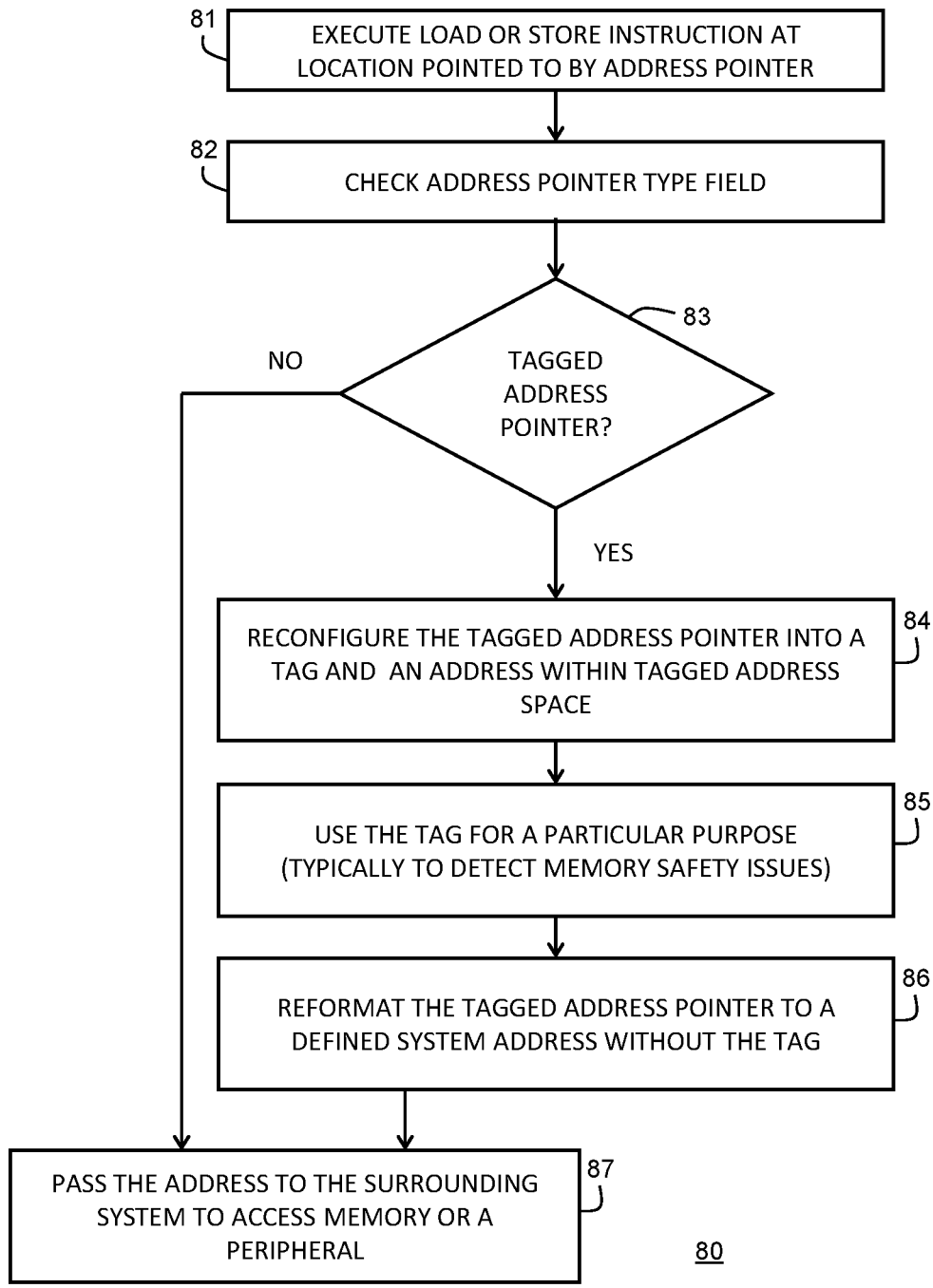
FIG. 6 illustrates a method for accessing a memory using an address pointer with a type bit field according to an embodiment.

FIG. 6 illustrates method 80 for accessing a memory using an address pointer with a type bit field according to an embodiment. Method 80 starts at block 81. At block 81, a load or store instruction is executed by a processor to access a location pointed to by an address pointer. At block 82, an address pointer type bit field is checked to determine if the address pointer is tagged or untagged. At decision block 83, if it is determined that the address pointer is not tagged, the NO path is taken to block 87 where the address of the address pointer is passed to the surrounding system that the processor is part of to access a memory or a peripheral. However, if at decision block 83 it is determined that the type bit indicates the pointer is tagged, the YES path is taken to block 84. At block 84, the tagged address pointer is reconfigured to separate the tag and address. At block 85, the tag is used for a particular purpose such as certain memory safety issues such as detecting out-of-bound memory accesses and use-after-free accesses. At block 86, the address portion is reformatted according to a defined system address without the tag. At block 87, the reformatted address is then passed to the system to access memory or a peripheral.

Using a type bit in the described manner to distinguish tagged pointers from untagged pointers allows the selective use of tagged pointers for the portions of memory space that need tagging for systems with a limited number of address pointer bits.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising:
  a processor configured to execute instructions to access a memory; and
  the memory coupled to the processor, the memory configured to have a plurality of memory portions, wherein a first address pointer is configured to include a tag, the first address pointer for accessing a first portion of the memory, and wherein a second address pointer is configured without a tag, the second address pointer for accessing a second portion of the memory,
  wherein the first address pointer is configured to have a type bit field, a tag bit field, and a first address bit field, wherein the second address pointer is configured to have only the type bit field and a second address bit field without the tag bit field, and wherein the type bit field is set to a first value for the tagged pointer and a second value for the untagged pointer.

2. The data processing system of claim 1, wherein the tag is used to detect a safety issue of the memory.

3. The data processing system of claim 1, wherein the first portion of the memory is a random access memory and the second portion of the memory is used for one or more of a boot read only memory, a peripheral, and a field programmable gate array.

4. The data processing system of claim 1, wherein the type bit field comprises a single bit.

5. The data processing system of claim 1, wherein the type bit field comprises multiple bits.

6. The data processing system of claim 1, wherein the type bit field comprises two type bits for providing three tagged address pointer types, each of the three tagged address pointer types addressing a particular address range in the data processing system.

7. The data processing system of claim 1, wherein the type bit field includes a most significant bit of the first address pointer.

8. The data processing system of claim 1, wherein the processor is further configured to reconfigure the tagged address pointer to remove the type bit field, the tag bit field and to reformat the first address bit field according to a predefined criterion.

9. A method comprising:
executing, by a processor, an instruction to access a location in the data processing system pointed to by an address pointer;
checking if the address pointer is a tagged address pointer or an untagged address pointer, wherein the tagged address pointer has a type bit field, a tag bit field, and a first address bit field, wherein the untagged address pointer has the type bit field and a second address bit field without the tag bit field, and wherein the type bit field is set to a first value for the tagged address pointer and to a second value for the untagged address pointer;
in response that the checking determines that the address pointer is a tagged address pointer, using a tag in the tag bit field of the tagged address pointer according to a designated purpose in a data processing system comprising the processor;
in response that the checking determines that the address pointer is a tagged address pointer, using an address in the first address bit field of the tagged address pointer to access the location; and
in response that the checking determines that the address pointer is an untagged address pointer, using an address in the second address bit field of the untagged address pointer to access the location.

10. The method of claim 9, further comprising reconfiguring the tagged address pointer to remove the type bit field and the tag bit field prior to using the tagged address pointer for a load or store operation to a memory location.

11. The method of claim 9, wherein the type bit field comprises a single bit.

12. The method of claim 9, wherein the type bit field comprises multiple bits.

13. The method of claim 9, wherein the type bit field comprises two type bits for providing three tagged address pointer types, each of the three tagged address pointer types addressing a particular address range.

14. The method of claim 9, wherein the tag is used to detect a memory safety issue.

15. A computer program comprising instructions stored in a non-transitory medium that when executed perform operations comprising:
executing, by a processor, an instruction to access a location in the data processing system pointed to by an address pointer;
checking if the address pointer is a tagged address pointer or an untagged address pointer, wherein the tagged address pointer has a type bit field, a tag bit field, and a first address bit field, wherein the untagged address pointer has the type bit field and a second address bit field without the tag bit field, and wherein the type bit field is set to a first value for the tagged address pointer and a second value for the untagged address pointer;
when the checking determines that the address pointer is a tagged address pointer. using a tag in the tag bit field of the tagged address pointer according to a designated purpose in a data processing system comprising the processor;
when the checking determines that the address pointer is a tagged address pointer, using an address in the first address bit field of the tagged address pointer to access the location; and
when the checking determines that the address pointer is an untagged address pointer, using an address in the second address bit field of the untagged address pointer to access the location.

16. The computer program of claim 15, further comprising reconfiguring the tagged address pointer to remove the type bit field and the tag bit field from the tagged address pointer prior to using the tagged address pointer for a load or store operation to a memory location.

17. The computer program of claim 15, wherein the type bit field comprises a single bit.

18. The computer program of claim 15, wherein the type bit field comprises multiple bits.

19. The computer program of claim 15, wherein the type bit field comprises two type bits for providing three tagged address pointer types, each of the three tagged address pointer types addressing a particular address range.

20. The computer program of claim 15, wherein the tag is used to detect a memory safety issue.

* * * * *